United States Patent
Lee et al.

(10) Patent No.: US 6,535,883 B1
(45) Date of Patent: Mar. 18, 2003

(54) SYSTEM AND METHOD FOR CREATING VALIDATION RULES USED TO CONFIRM INPUT DATA

(75) Inventors: Joo-Hyung Lee, Vancouver (CA); Michael Shane Brown, Grandview, MO (US); Randolph D. Roesler, Coquitlam (CA)

(73) Assignee: MDSI Software Srl, St. Michael (BB)

(*) Notice: Subject to any disclaimer, the term of this patent is extended or adjusted under 35 U.S.C. 154(b) by 0 days.

(21) Appl. No.: 09/368,486

(22) Filed: Aug. 4, 1999

(51) Int. Cl.[7] .............................. G06F 17/00; G06F 7/00
(52) U.S. Cl. ....................... 707/100; 717/109; 717/113; 345/763; 345/853; 707/102; 707/201; 707/505
(58) Field of Search .................................. 707/1–5, 100, 707/102, 201, 505; 345/338, 762–763, 853–855; 717/110–113, 104–109

(56) References Cited

U.S. PATENT DOCUMENTS

| | | | | |
|---|---|---|---|---|
| 5,485,618 A | * | 1/1996 | Smith .......................... | 345/338 |
| 5,487,141 A | * | 1/1996 | Cain et al. ................... | 345/764 |
| 5,608,898 A | * | 3/1997 | Turpin et al. ................ | 707/201 |
| 5,619,688 A | * | 4/1997 | Bosworth et al. .............. | 707/4 |
| 5,651,108 A | * | 7/1997 | Cain et al. ................... | 345/763 |
| 5,710,901 A | | 1/1998 | Stodghill et al. ............. | 395/339 |
| 5,745,712 A | * | 4/1998 | Turpin et al. ................ | 345/333 |
| 5,784,583 A | | 7/1998 | Redpath ....................... | 395/353 |
| 5,798,757 A | * | 8/1998 | Smith .......................... | 345/338 |
| 5,812,840 A | * | 9/1998 | Shwartz ........................ | 707/4 |
| 5,815,152 A | * | 9/1998 | Collier et al. ................ | 345/839 |
| 5,864,819 A | | 1/1999 | De Armas et al. ............ | 704/275 |
| 5,930,764 A | * | 7/1999 | Melchione et al. ............ | 705/10 |
| 5,966,695 A | * | 10/1999 | Melchione et al. ............ | 705/10 |
| 6,014,138 A | * | 1/2000 | Cain et al. ................... | 345/826 |
| 6,016,488 A | * | 1/2000 | Bosworth et al. .............. | 707/4 |
| 6,208,985 B1 | * | 3/2001 | Krehel ......................... | 707/3 |
| 6,212,672 B1 | * | 4/2001 | Keller et al. ................ | 717/104 |

FOREIGN PATENT DOCUMENTS

WO    WO-02/23376 A1 * 3/2002 .......... G06F/17/00

OTHER PUBLICATIONS

"Optima++:DataWindow Builder User's Guide", Powersoft Corporation, Sep. 1996, pp. 303–314. QA76.9.C55 06 1996 Pt. 2.*

Optima++"DataWindows™ Builder User's Guide Version 1.5", Powersoft Corporation, pp. 303–314 QA76.9.C55 06 1996 Pt.2.*

Taylor, A.G. "ObjectVision 2.0 Developer's Guide", New York:Bantam Books, Apr. 1992, pp. 24–25, 45–54 and 330–334. ISBN 0–553–35409–4. QA76.8.024 T39 1992.*

* cited by examiner

Primary Examiner—Jean R. Homere
Assistant Examiner—Luke S Wassum
(74) Attorney, Agent, or Firm—Dorsey & Whitney LLP

(57) ABSTRACT

A graphical user interface is provided for creating a set of validation rules. A form is represented in a tree structure with nodes representing fields to be filled out in the form. Rules are added to the fields using a dialog box and are represented as subnodes of fields. Expressions are added to the rules as subnodes of the rules through a menu. The completed tree structure is translated into a set of validation rules.

38 Claims, 10 Drawing Sheets

SYSTEM AND METHOD FOR CREATING VALIDATION RULES USED TO CONFIRM INPUT DATA

FIELD OF THE INVENTION

The present invention generally relates to a system and method for validating data collected by application software, and more particularly to a graphical user interface for creating validation rules which confirm the validity of data collected by application software used in mobile workforce management.

BACKGROUND OF THE INVENTION

In many industries which employ a large mobile workforce, such as utilities, taxi companies, and large equipment repair services, the efficiency with which mobile workers can be scheduled and dispatched to customers can have a great impact on customer satisfaction as well as on a service provider's bottom line. From the customer satisfaction standpoint, it is not uncommon for a customer to call a cable television company, or other service provider, to request service only to be told to choose a four-hour service window on good days, or an "all day" service window on bad days. Even when the customer is "lucky" enough to request service on a "good" day, the worker dispatched by the service provider typically will arrive well after the window has closed, or the customer will have waited, and wasted, most of the day for what should typically only be a half-hour service call. This situation arises from an inability of the service provider to accurately predict when a particular worker will complete a given task and how long it will take for the worker to reach the next service location.

From the financial standpoint, inefficient scheduling and dispatching results in fewer service calls being performed each day, potentially resulting in lower earnings per worker-hour, as well as possible additional expenditures required for hiring and training additional workers. To improve scheduling and dispatching, many service providers have implemented a documentation process for collecting information pertinent to a service request. Each business typically has its own unique set of paper service forms, each having a number of relevant fields in which the worker inputs data as the service job is being performed. As with the collection of any kind of information, certain types, formats, and/or ranges of information are expected for certain fields. For instance, a field for "arrival time" must be completed with a time of day, and would be expected to fall during or near normal work hours. When workers complete the paper forms, the worker must remember certain rules or guidelines for filling out the fields. If the rules are followed properly, the forms are correctly filled out and the service provider is given accurate information with which to analyze its business, e.g., modify schedules, dispatch additional workers, etc. Often, however, the worker makes mistakes when filling out the forms which are only discovered after the worker returns to a business site (e.g., a dispatch office) at the end of the day, turns in the forms for the day's service requests, and the forms are reviewed. By the time the errors are discovered, many hours or even days may have passed, making it difficult to correct the errors and perhaps invalidating any scheduling or dispatching adjustments previously made based on the incorrect information.

More recently, computerized systems have been developed which have replaced the paper forms with electronically stored and implemented forms. Typically, in such systems, a centralized server computer including all business logic and having access to the necessary databases communicates via a wireless or other type network with a mobile client computer carried by a worker. Both paper forms and their electronic equivalents have fields for entering data desired for a particular service task, as well as a heading labeling each field and perhaps some instructional information. The mobile computer includes application software, such as a mobile pen application (MPA), which electronically implements the service forms of a particular service provider to allow the worker to enter various data concerning each service job. The MPA for electronically implementing a particular form includes fields for entering data, the heading for each field of the form and any instructional information. Data entered into the fields is sent back to the centralized server computer where the worker's schedule may be updated, if necessary, based on such factors as whether a job took more or less time than anticipated, or whether an emergency service must be scheduled for a worker who is geographically near the emergency service site. The mobile computer typically also includes Global Positioning System (GPS) capabilities to allow the central computer to precisely track the geographic location of the worker.

In order to ensure the validity of the data entered by the worker, some or all of the fields will have an associated validation rule. A validation rule is simply a logical sequence of operators and operands for performing one or more tests or comparisons on data in one or more fields to make sure the data is valid. The MPA implements a particular form using a set of validation rules to ensure correct entry of data. The validation rules are loaded into the MPA, and validation rules associated with fields in the rules file are associated with the corresponding field names in the MPA. The validation rules test the contents of each field entered by the user to ensure that the field is filled out correctly, either after the worker enters data into a the field, or after the form is transmitted back to a centralized server computer. Either way, errors are caught before the worker leaves the service site.

Due to each service provider having its own unique set of service forms, each service provider must undergo a lengthy, inefficient process for determining the validation rules appropriate for each form and for the MPA in which the forms are implemented. Typically, this has meant that an MPA analyst, an engineer or project manager, will go to the service provider's business site, and work with the employees of the service provider to specify, for each field of a form any rules, which may include rules of thumb, that a worker follows when filling out the fields. The MPA developer, a programmer who writes code for implementing the validation rules, then takes the specified rules and creates a set of validation rules in MPA-compatible code which is saved as a rules file for the form. This validation rule creation process can take several weeks and require many hours from the MPA developer and from the employees of the service provider.

Consequently, what is needed is a user-friendly, computer-based system and method for quickly and easily creating sets of validation rules to thereby shorten the validation rules creation process. The system and method should be independent of the type or nature of both the form being validated as well as the particular MPA being implemented. As explained in the following, the present invention provides a method and apparatus that meets these criteria and solves other problems in the prior art.

SUMMARY OF THE INVENTION

The present invention is a user-friendly, computer-based system and method for quickly and easily creating sets of validation rules for forms. A graphical user interface (GUI) is provided which may be used at a business site by the service provider's employees to develop sets of validation rules using a natural language. The GUI of the present invention displays a representation of a form as a tree structure, with the root node representing the name of the form, and the leaf nodes for representing fields of the form. The user begins by selecting a form template, which is a template for creating and completing a set of validation rules for fields for a form. A form template is a text file including the name of the form and the names of the used fields for the form. The names in the form template are used by the GUI to display the tree representation. The number of field names is used to determine the number of leaf nodes for the tree. The system of the present invention loads in a selected form template, reads the first text string in the form template and displays it as the root node of the tree to represent the form name. Subsequent strings in the form template are read in and displayed as leaf nodes to represent field names.

Sets of validation rules are created for a form interactively, by selecting fields, adding appropriate validation rules to be implemented for the fields, and adding appropriate expressions for the validation rules. Validation rules are displayed as subnodes of fields, and expressions as subnodes of the validation rules. One or more validation rules may be defined for each field, and one or more expressions may be defined for each validation rule. An expression is a logical sequence of operands and operators, implementing a single test or comparison, which can be evaluated as TRUE or FALSE. A validation rule, then, is a logical sequence of operands and operators, implementing one or more tests, one for each expression, which can be evaluated as TRUE or FALSE. If the validation rule evaluates as TRUE, then the data entered into the field is considered valid. If the validation rule evaluates as FALSE, on the other hand, then a data entry error is considered to have occurred, and a user-defined error message is displayed to the worker who entered the invalid data. Depending on a definition in the validation rule, the worker may be allowed to transmit the data anyway, such as when the validation rule is implementing a rule of thumb rather than a strict rule, or may force the worker to correct the entered data.

The GUI of the present invention uses a menu interface which presents, in plain English, a user with the choices that are likely to be needed to develop validation rules. The user selects from the displayed tree structure, the fields for which validation rules are to be added, then selects expressions from a menu. The menu presents the expressions as expression templates, which are templates for creating and completing an expression. The expression template includes the test or comparison operator for the expression and indicates the type of operand or operands that must be added to complete the expression. Thus, the user interface of the present invention allows a user to create a validation rule by selecting a template and fill in the blanks.

Where multiple expressions are defined for a rule, the user interface provides a join operation to allow a user to quickly select how the expressions should be evaluated (e.g., conjunctively (AND) or disjunctively (OR)) and place parentheses around groups of expressions to define an evaluation order where three or more expressions are defined.

While a tree structure is described herein, those skilled in the art will recognize that other graphical representations may be implemented without departing from the spirit of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
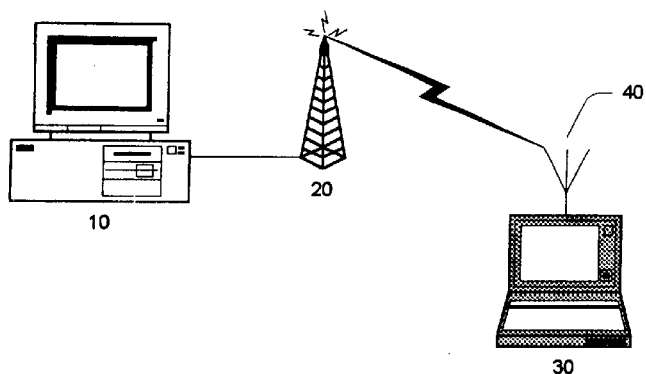
FIG. 1 is a block diagram of an exemplary computing environment including a mobile computer and a server computer in which the present invention is implemented.

FIG. 1 illustrates a typical computing environment in which the present invention is implemented. A personal computer 10 is provided and is used to create a set of validation rules for validating data entries made to service provider forms in accordance with the present invention. More specifically, the personal computer 10 shown in FIG. 1 is installed with a validation rules program 15 (see FIG. 20), which enables a user to create a set of form validation rules as described in more detail below. Once created, the validation rules are translated to a rules file 16 (see FIG. 2) and communicated via a wireless network 20 to a mobile computer 30 for use in validating the data entries made by a mobile worker to an associated form.

It will be appreciated that FIG. 1 illustrates only one example of a suitable computing environment in which the invention may be implemented. Although not required, the validation program 15 will generally be implemented by the computer 10 as computer-executable instructions, such as program modules. Generally, program modules include routines, programs, objects, components, data structures, etc. that perform particular tasks or implement particular abstract data types. Moreover, those skilled in the art will appreciate that the validation program 15 may be practiced with other computer system configurations, multiprocessor systems, minicomputers, server computers, and mainframe computers. The validation program 15 may also be practiced in distributed computing environments where tasks are performed by remote processing devices that are linked through a communications network. In a distributed computing environment, program modules may be located in both local and remote memory storage devices.

Figure 2:
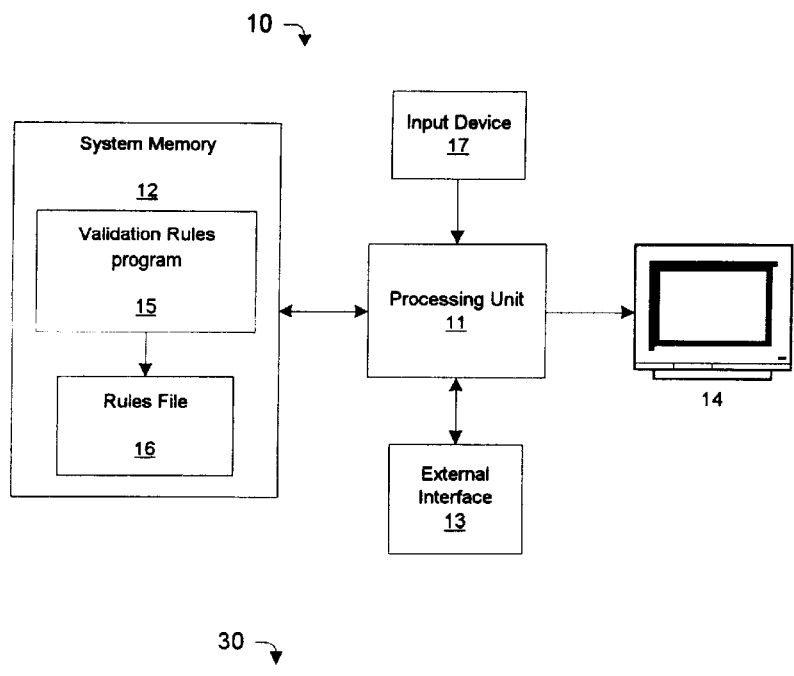
FIG. 2 is a schematic block diagram of the several components of the server computer shown in FIG. 1 that are used to implement a validation rules program formed in accordance with the present invention to automatically create a set of validation rules for confirming data input by a user of the mobile computer.

FIG. 2 depicts several of the key components of the computer 10. It will be appreciated by those of ordinary skill in the art that the computer 10 includes many more components than those shown in FIG. 2. However, a disclosure of an actual embodiment for practicing the present invention does not require that all of these generally conventional components be shown. The computer 10 includes a processing unit 11 coupled to a system memory 12, an external interface 13, a user input device 17, and a display 14. The system memory 12 comprises a read-only memory, a random-access memory and a permanent storage device, such as a hard disk drive, tape drive, optical drive, floppy disk drive, or combination thereof and stores program 15 of the present invention as well as rules file 16. The rules file 16 stores the validation rules created by the validation program 15 in text format for ultimate transfer to the mobile computer via the external interface 13.

In one embodiment of the present invention, the external interface 13 comprises a wireless modem which establishes a wireless communication link with the mobile computer 30. In yet other embodiments, in which the personal computer 10 and mobile computer 30 are connected via a "wired" intra or internetwork, the external interface 13 comprises a network interface card specifically constructed for use with the appropriate network communication protocols, network configurations (bus, token ring, etc.) and coupling media required for the network. Finally, in yet other embodiments of the present invention, the external interface 13 may comprise serial input and output ports for connecting directly to the mobile computer 30.

Finally, the personal computer includes a user input device 17, which may comprise a keyboard, touchscreen, mouse, light pen, digitizing pad, scanner, or other such device as is well-known in the art, which is operated by the user to control the validation rules program 15.

As noted above, in a present embodiment of the invention illustrated in FIG. 1, the personal computer 10 communicates with the mobile computer 30 via a wireless network 20. However, it will be appreciated that the personal computer 10 may be connected to the mobile computer 30 via any type of communication link without departing from the spirit and scope of the present invention, e.g., a "wired" intranetwork or internetwork, a remote telephone/modem connection, a direct port-to-port connection, etc., as long as the personal computer 10 and mobile computer 30 are equipped with the necessary and appropriate external interfaces as mentioned above. With respect to the mobile computer 30, it will include an antenna 40 and transceiver (not shown) for transmitting and receiving radio signals to and from the personal computer 10 if communication is made via the wireless network 20.

Figure 3:
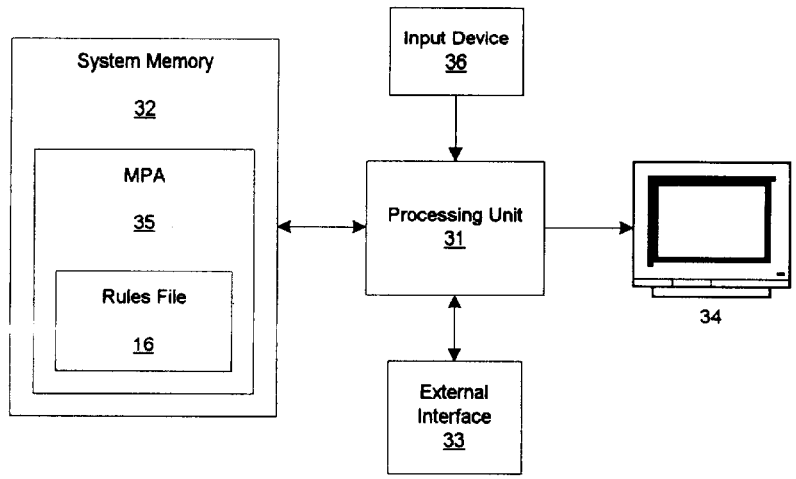
FIG. 3 is a schematic block diagram of the several components of the mobile computer shown in FIG. 1 that are used to implement the set of validation rules created by the validation rules program.

In addition to the components mentioned above, the mobile computer 30 includes a number of other key components necessary for implementing the present invention as shown in FIG. 3. It will be appreciated by those of ordinary skill in the art that the mobile computer 30 includes many more components than those shown in FIG. 3. However, a disclosure of an actual embodiment for practicing the present invention does not require that all of these generally conventional components be shown. Like the personal computer 10, the mobile computer 30 includes a processing unit 31, a system memory 32, an external interface 33, a user input device 36, and a display 34. The system memory 32 comprises a conventional disk, floppy disk drive, read-only memory and random-access memory. The system memory 32 stores the mobile pen application (MPA) 35 which executes the rules file 16 created by the validation rules program 15 and communicated to the mobile computer 30 by the personal computer 10.

Now that the components of the personal computer 10 and mobile computer 30 have been described, the validation rules program 15 will be discussed in further detail. The validation rules program 15 of the present invention generates an easy-to-use graphical user interface (GUI) to allow a service provider employee to quickly create a set of validation rules for a form, without assistance from an MPA developer. To do this, the validation rules program 15 represents and displays a form and its fields as a tree structure. The tree structure for a particular form is generated from a user-selected form template which is a file containing the form name and the names for the used fields for the form. The form name is displayed as the root node of the tree, and the names of the fields are displayed as leaf nodes. The GUI of the validation rules program includes a menuing interface for adding validation rules to fields, and for selecting expressions for implementing tests in validation rules. Commonly-used expressions are predefined as expression templates in the validation rules program 15, and are presented in a menu for quick selection by the user. An expression template includes an operator and blanks for the user to fill out for the one or more operands. The various expression templates are described in plain English, or another natural language.

Figure 4:
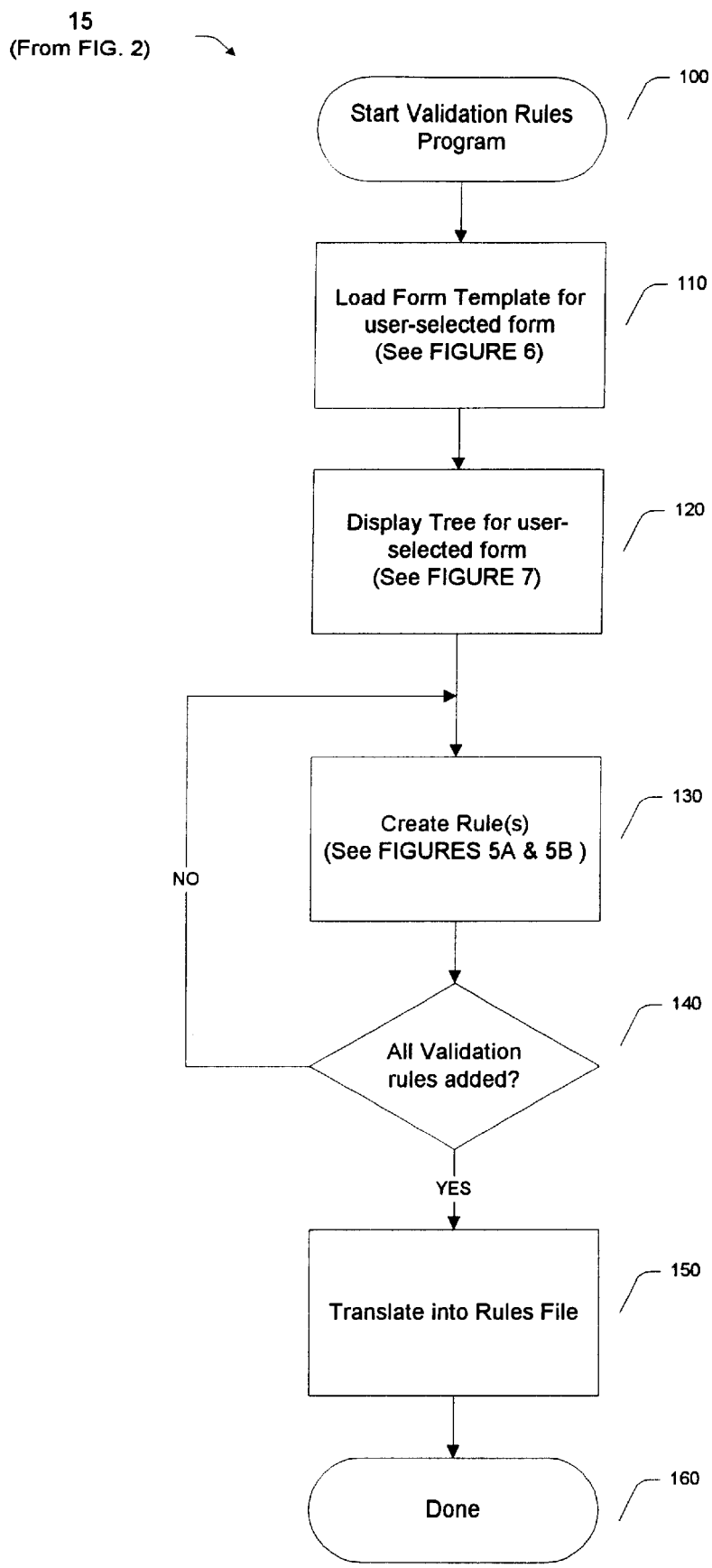
FIG. 4 is a flow chart illustrating the logic used by the validation rules program to create a set of validation rules.
Figure 6:
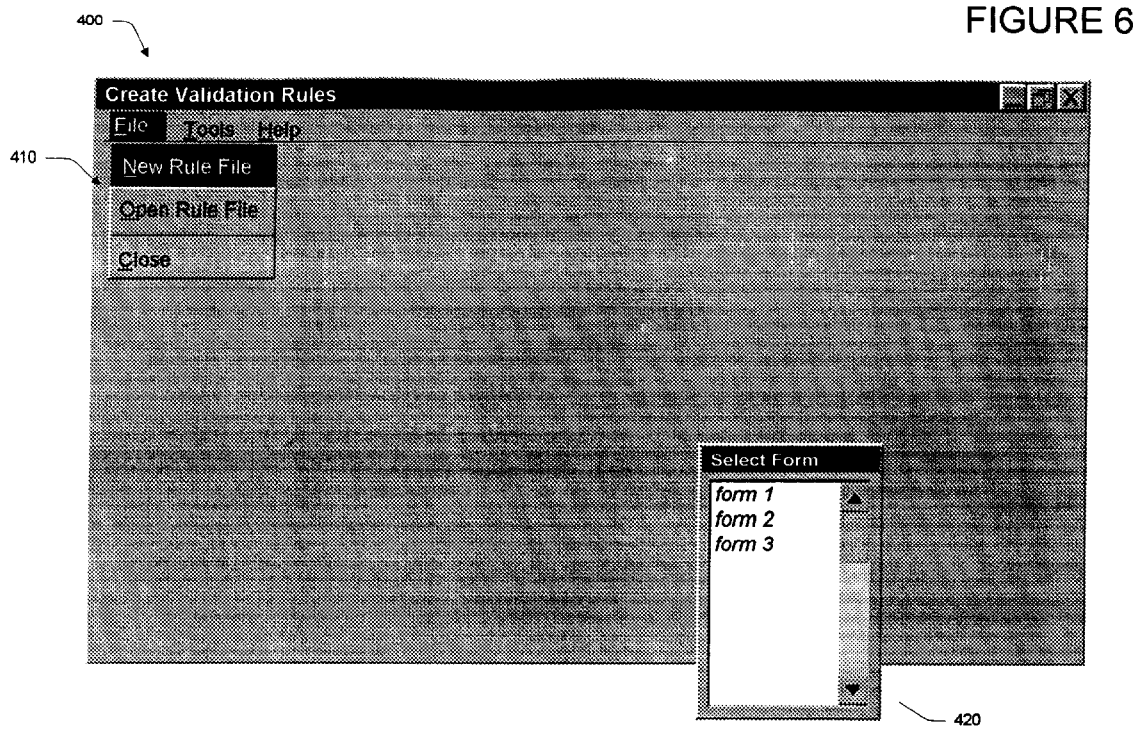
FIGS. 6–17 are various windows produced by the validation rules program for creating a set of validation rules as desired by the user.

FIG. 4 illustrates the logic used by the validation rules program 15 to enable the user to create a set of validation rules for a particular form to be executed by a mobile pen application (MPA) on the mobile computer 30. The validation rules program 15 begins in a block 100 and proceeds to a block 110 in which the user selects a particular form for which the user wishes to create validation rules. As shown in more detail in FIG. 6, the validation rules program 15 generates a create validation rules window 400 on the display 14 of the personal computer 10 upon start-up. When the user selects a new rule file option 410 from the create validation rules window 400, the validation rules program 15 displays a listbox 420 containing the names of a number of forms available for validation rule creation. A listbox is simply a display box having names of items which may be chosen listed therein. A user may also type in new items which will be included in the list. Listboxes and menus, as well as their implementations are well-known in the art and will not be discussed herein, as a detailed description is not necessary for an understanding of the present invention.

While the listbox 420 will typically include the names of a number of pre-defined forms to choose from, those skilled in the art will readily appreciate that forms (and thus, their associated form templates) may be added to the listbox 420 and system memory 12 at any time and may be selected in any manner. In a typical setting, where a service provider already has a set of paper forms, a form template may be created for a paper form by creating a text file and typing in the name of the form, as well as names for fields of the form. In this manner, a service provider's paper forms may very quickly be converted into form templates. Those skilled in the art will appreciate that other methods of creating form templates may be employed without departing from the spirit of the invention.

Figure 7:
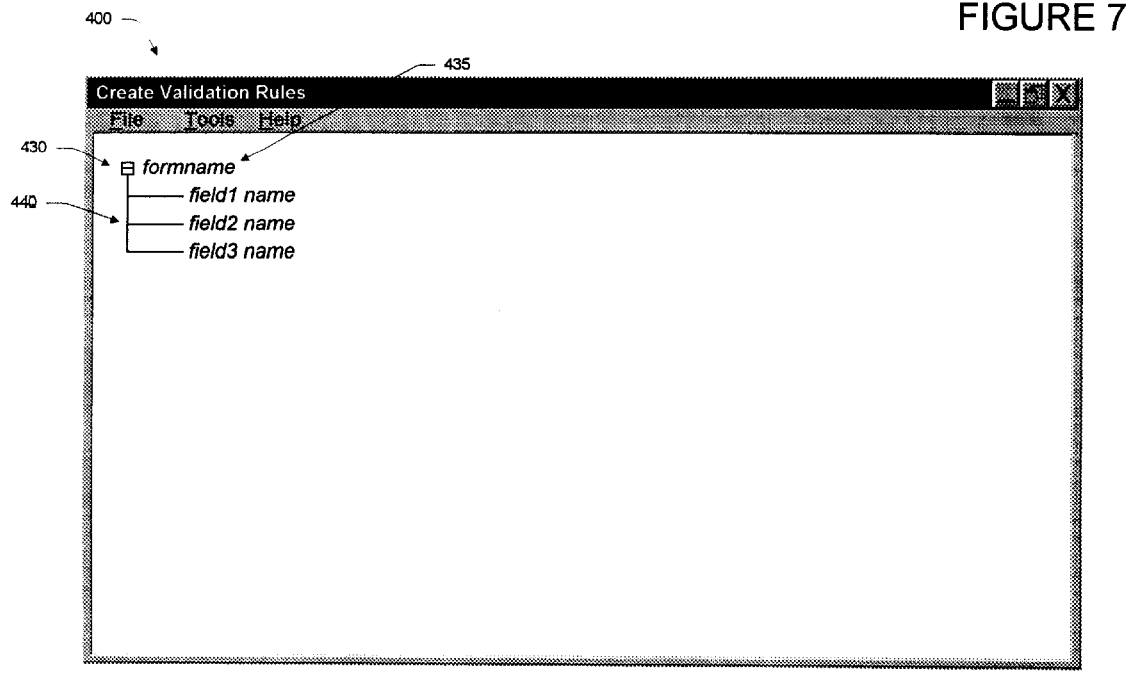

Returning to FIG. 4, once the user selects the desired form from the form listbox 420 (by highlighting and selecting the desired form name with the user input device 17), the form template associated with the selected form is retrieved from system memory 12 of the computer 10 and displayed in a block 120 as a tree structure 430 in the create validation rules window 400 as shown in FIG. 7. As noted above, the form template is a file containing the form name and the names of commonly-used fields of the form. The validation rules program 15 of the present invention reads in the first line of the form template, which holds the form name, and displays it as the root node 435 of the tree structure 430. Each of the subsequent lines of the form template, i.e., each of the field names of the form, are read in and displayed as leaf nodes 440 of the tree structure 430. It will be appreciated that tree structure 430 may be stored in system memory 12 as a list, a table, or any other well-known data structure without departing from the spirit of the invention.

Returning to FIG. 4, after the tree structure 430 representing the form template associated with the selected form is displayed, the validation rules program 15 proceeds to a block 130 in which it enables the user to create at least one rule for the selected form. The routine for creating these rules is described in more detail below in conjunction with FIGS. 5A and 5B. Once the validation rules for the chosen form have been completed in block 130, the validation rules program 15 proceeds to a decision block 140 where the user determines if the set of validation rules is complete, i.e., whether the user wishes to create any more rules. It should be noted at this point that not all fields require validation rules. For instance, a form may include a fields for notes, in which a worker may enter any kind of information, or nothing at all.

If, at block 140, it is determined that the set of validation rules is complete, the user selects the Close option from the File menu and the validation rules are translated into a text format in rules file 16, and the validation rules program terminates in a block 160. It will be appreciated that in some embodiments of the present invention, the rules file 16 is automatically transferred to the mobile computer 30 via the wireless network 20. In yet other embodiments, however, the rules file 16 is transferred only upon request or at a predetermined time.

If, at block 140, the user wishes to create more validation rules, the validation rules program repeats block 130 until a complete set of validation rules has been created. In other words, the rules creation routine shown in FIGS. 5A and 5B is repeated until the form is complete.

Figure 5A:
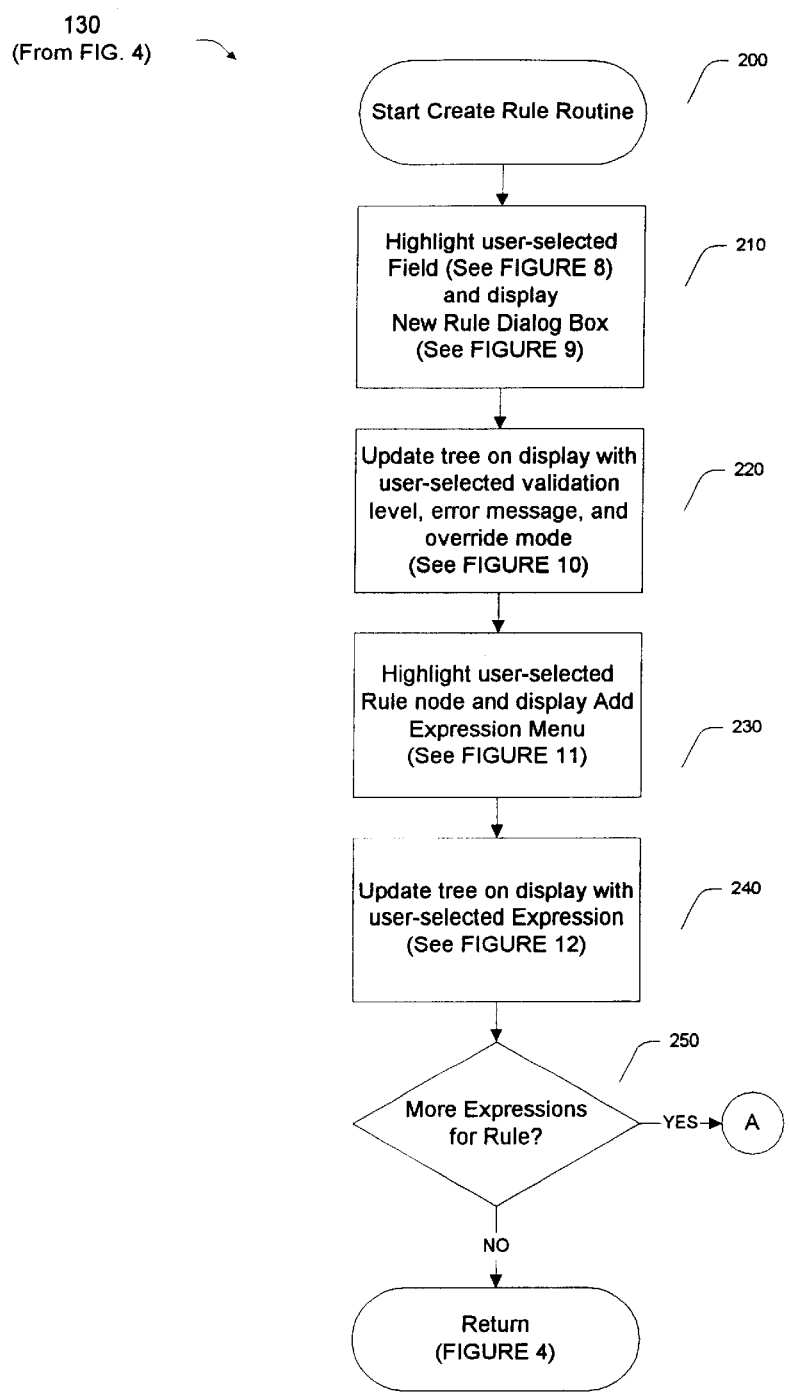
FIGS. 5A and 5B are flowcharts illustrating the logic used to create a particular validation rule.
Figure 5B:
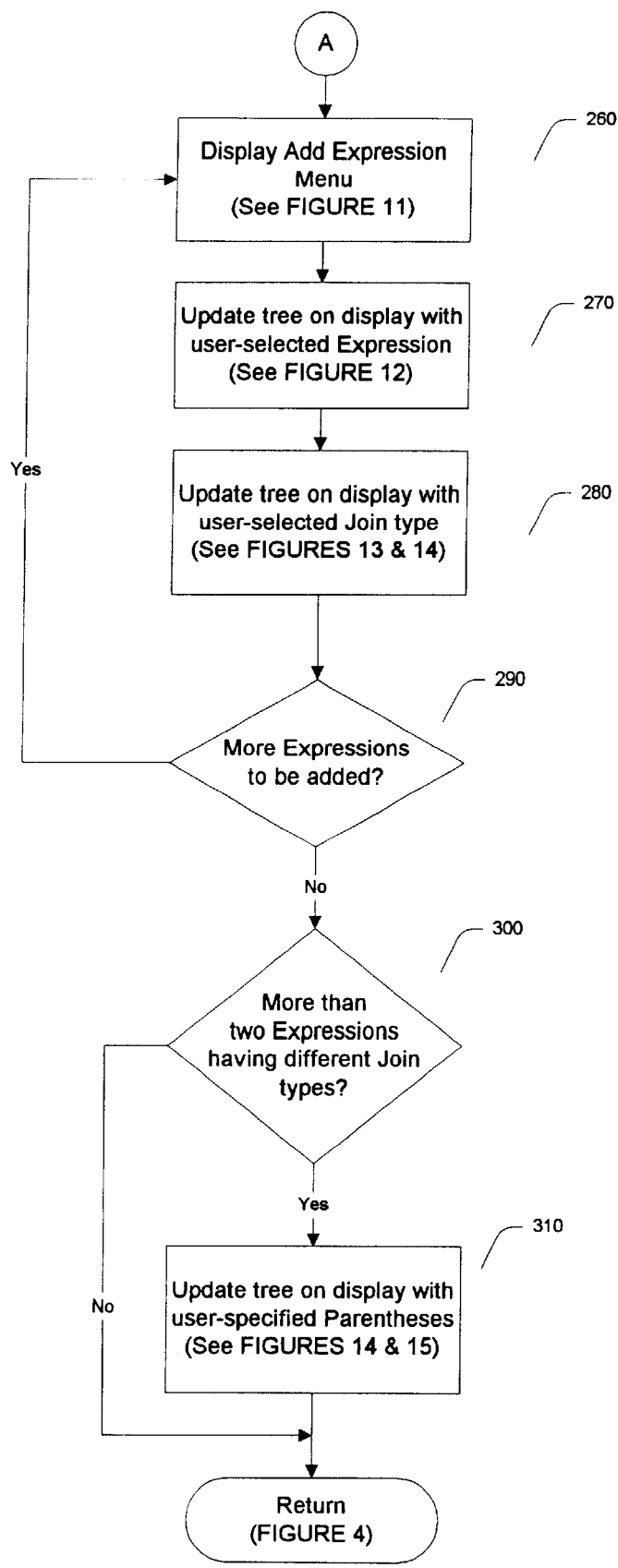
Figure 8:
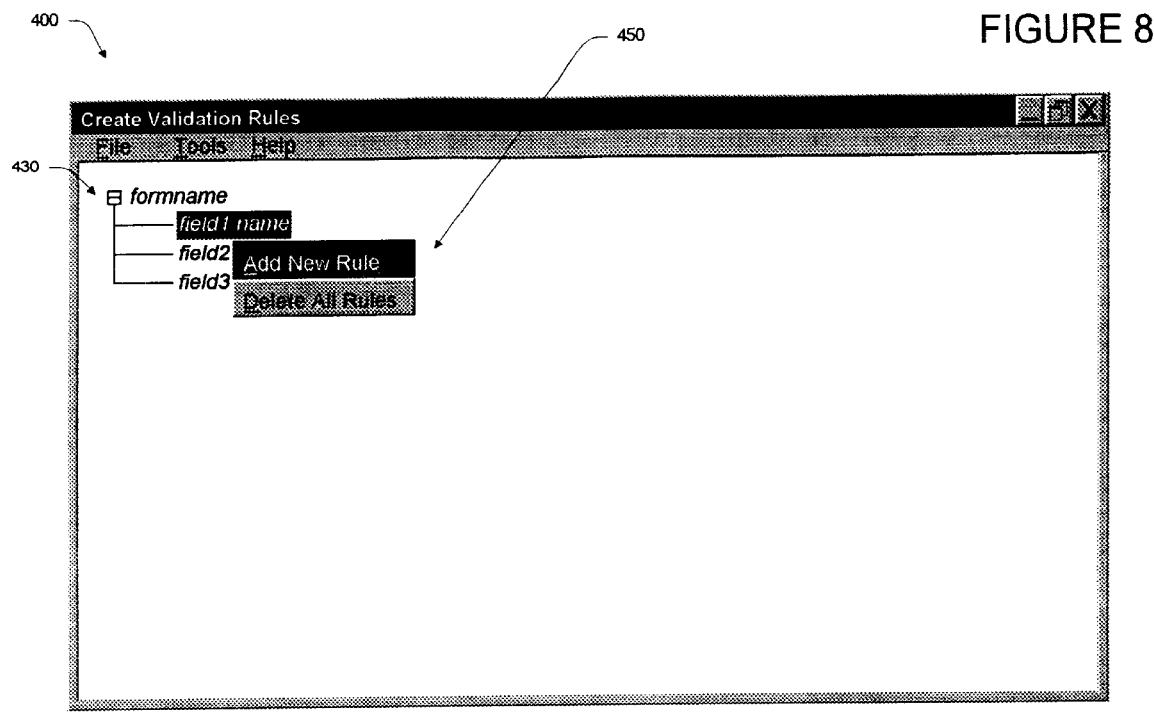
Figure 9:
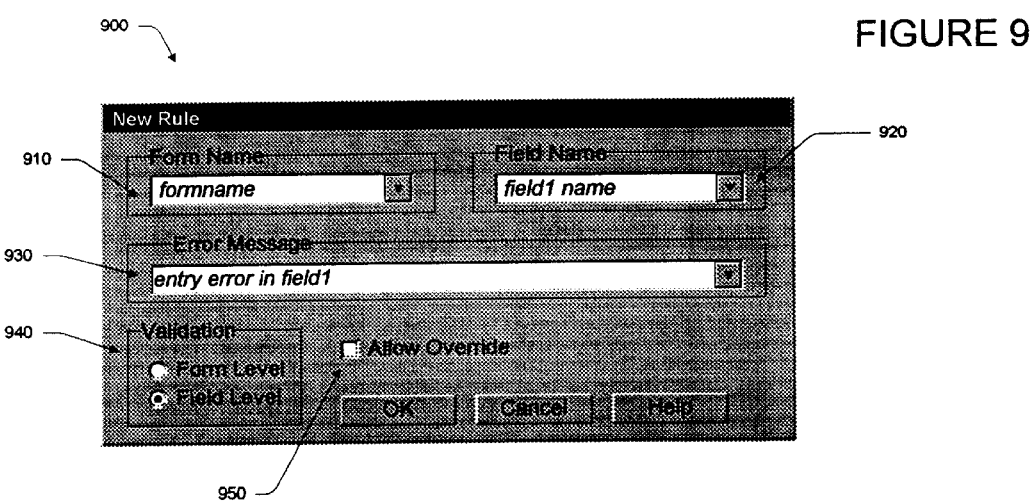

Referring to FIG. 5A, the rules creation routine begins in block 200 and proceeds to a block 210 in which the user selects a field from the tree structure 430 displayed in the create validation rules window 400 for which a new validation rule is to be added. Referring to FIG. 8, when the user selects a field, such as field1 name, a menu 450 is displayed to allow the user to either add a new rule to be applied to the selected field, or delete all rules applied to the selected field. It should be noted that it is not required for each field to have a validation rule. If a field is left empty it means there will be no validation executed on that field. If the user selects the add new rule option, the validation rules program 15 generates a new rule dialog box 900 on the display 14 of the personal computer 10 as shown in FIG. 9. The new rule dialog box 900 enables the user to define basic parameters of a validation rule and includes a form name field 910, a field name field 920, an error message field 930, a validation level field 940, and an override field 950 for defining these basic parameters. In an embodiment of the present invention, the form name and field name fields default to the names of the user-selected form and field, but may be implemented to allow selection or entry of other forms and/or fields without departing from the spirit and scope of the present invention.

The error message field 930 allows the user to enter an error message to be displayed to a mobile worker when improper data has been entered into the field in the associated form according to the validation rule to be subsequently defined by the user. In other words, if the validation rule for this field evaluates to FALSE, the error message is displayed. In one actual example shown in FIG. 9, "entry error in field1" is the chosen error message. In one actual embodiment of the present invention, the error message field 930 is implemented as a listbox. Each time a new error message is entered by the user, it is added to a list of error messages displayed in the listbox for selection. Consequently, the next time that error message is used, the user may simply choose the error message from the listbox, rather than retype it in the error message field 930.

In addition to the error message field, the new rule dialog box 900 includes a validation level field 940, which is used to indicate where the validation rule is to be executed, i.e., either at a "form level" or a "field level." If the validation rule is to be executed when the worker moves off of the field such as by entering data into another field, the user selects the field level option. However, if the user does not wish for the validation rule to be executed until the form being filled out by the mobile worker has been completed and sent back to the computer 10, the user selects the form level option. In the example shown in FIG. 9, the field level option is shown selected.

Finally, the user has the option of selecting the override field 950. If the override field 950 is checked indicating an "Allow Override" mode, the worker is allowed to transmit the form even if the data entered into the selected field failed the associated validation rule. In such cases, the MPA implementing the form will simply display the error message specified in the error message field 930 and allow the user to transmit the form back to the computer 10 anyway. If the override field 950 is left unchecked, as depicted in FIG. 9, the MPA will not allow the user to transmit the form until the error is resolved, i.e., until the associated validation rule is satisfied. Allowing an override is useful where the validation rule is implementing a rule of thumb rather than a strict rule. The displaying of an error message prompts the worker to double-check the data. If the data is correct, even if it is atypical data, the worker is allowed to override the validation rule and transmit the data anyway.

Figure 10:
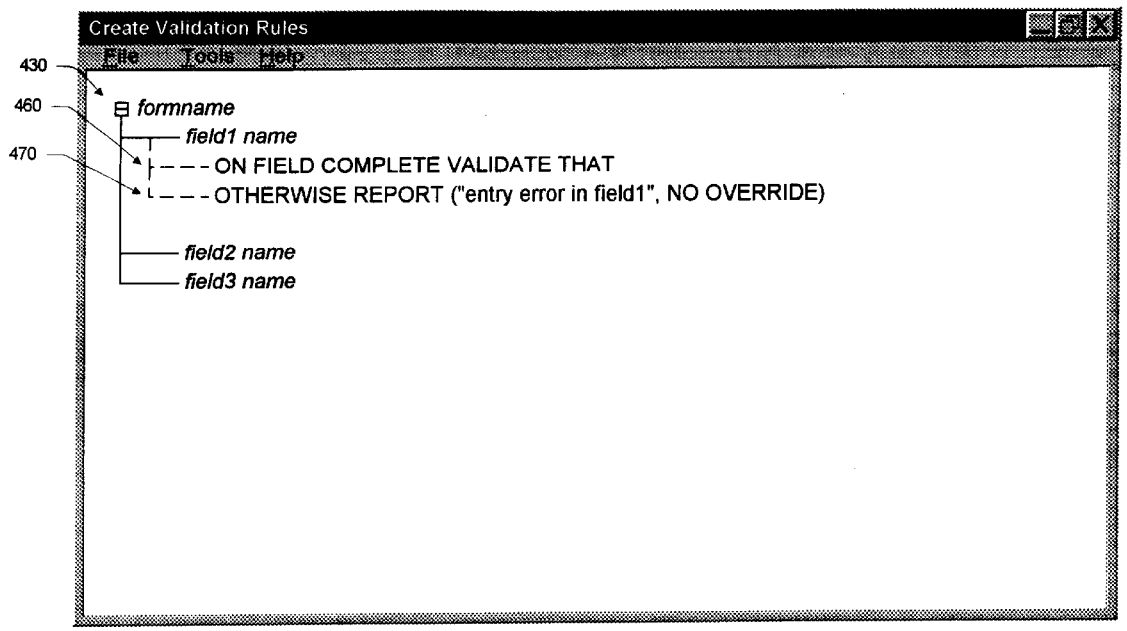

Returning to FIG. 5A, once all desired entries have been made in the new rule dialog box 900, the tree structure 430 in the create validation rules window 400 is updated in a block 220. As shown in more detail in FIG. 10, the tree structure 430 is updated to reflect the error message, validation level, and override mode of the new rule to be defined below the field selected for the rule. More specifically, first and second rule nodes 460 and 470 are shown as subnodes of the node for the user-selected field, field1 name. The first rule node 460 displays the text "ON FIELD COMPLETE VALIDATE THAT" to reflect that field level was chosen as the validation level in new rule dialog box 900. The text "OTHERWISE REPORT ("entry error in field1", NO OVERRIDE)" in the second rule node 470 depicts the user-entered error message and the user-selected override mode, in this case that an override was not allowed. In a present embodiment of the invention, the first and second rule nodes 460 and 470 form the beginning and end of a validation rule for a field, respectively. Expressions for the validation rule will be added between the first and second rule nodes 460 and 470.

Returning to FIG. 5A, after the basic parameters of the new validation rule, i.e., the error message, validation level and override mode, have been entered and added to the tree structure 430, the validation rules program 15 enables the user to add one or more expressions to the validation rule in a block 230. As will be described in more detail below, the data entered by the mobile worker in the corresponding field of the form associated with the present tree structure 430 will be compared against the expressions added to the rule to determine if the data input in the corresponding field is valid.

To add an expression, the user selects a rule node 460 from the tree structure 430 displayed in the create validation rules window 400 to which an expression is to be added. This may be done in a manner similar to that in which a field node is selected to add a rule. As shown in more detail in FIG. 11, when the user selects rule node 460, an action menu 480 is generated on the display 14 by the validation rules program 15, to allow the user to specify a join type (by which multiple expressions are logically joined) and a parenthesis function (by which the order in which multiple expressions to be evaluated is defined). Join types and parenthesis functions will be described in more detail below, after addition of multiple expressions has been discussed. To add an expression to the new validation rule, the user selects an add expression option from the action menu 480 to bring up an add expression menu 490. In one actual embodiment of the present invention, the add expression menu 490 includes commonly-used expressions which are implemented as expression templates in the add expression menu 490. As noted above, expressions are the tests to be performed on data entered in one or more corresponding fields of the associate form filled out by the mobile worker using the mobile computer 30. One or more expressions, in addition to the error message, validation level and override mode, are used to make up a validation rule. An expression template includes the operator for an expression and indicates the types of operand or operands and their relationship to the operator, such that the user may simply select a expression template and fill in the associated operand(s) to complete an expression. In a present embodiment of the invention, two types of expression templates are implemented: (1) conditional templates; and (2) comparison templates. Conditional templates are in the form of IF/THEN/ELSE statements. Comparison templates, on the other hand, compare data entered into a field with a predefined value or condition, or with data in another field. Those skilled in the art will readily appreciate that other types of expressions could be implemented without departing from the spirit and scope of the present invention.

Three conditional templates 495 are provided in the add expression menu 490. The three conditional templates 495 are in the form of IF/THEN/ELSE statements, with the first being the generic:

IF<condition>THEN<expression1>ELSE<expression2> where <condition> is evaluated to determine whether <expression1> or <expression2> should be returned as the result of the expression. <expression1> is returned if the conditional expression, <condition>, evaluates to TRUE, and <expression2> is returned if < condition> evaluates to FALSE. The <condition>, <expression1> and <expression2> operands are the blanks to be filled out by the user, and may be any such operands which may be required for a particular service provider's form. For instance, a service provider operating in a city bordering State A and State B may have a form which calculates a total cost including sales tax. If State A has an 8.6% sales tax, and State B has no sales tax, in the exemplary IF/THEN/ELSE expression, <condition> could be STATE=A, <expression1> could then be SALES TAX=8.6%, and <expression2> would be SALES TAX=0%. Thus, the completed rule would be IF STATE=A THEN SALES TAX=8.6% ELSE SALES TAX=0%.

The remaining two conditional templates are for implementing two additional common specific instances of the IF/THEN/ELSE statement. More specifically, IF<condition>THEN<expression1>ELSE TRUE causes<expression1> to be returned as the result of the expression if <condition> is satisfied, i.e., evaluates to TRUE. Otherwise, the conditional expression returns the value TRUE.

The third specific IF/THEN/ELSE conditional expression is

IF<condition>THEN<expression1>ELSE FALSE which also causes <expression1> to be returned if <condition> is evaluated as TRUE. If <condition> is evaluated as FALSE, however, then the conditional expression returns the value FALSE.

As noted above, in addition to the three conditional templates 495, the add expressions menu 490 also includes nine comparison templates 485, which include the following:

A Field Has Data comparison template 481 is used to test whether a field contains data. Consequently, if the associated field contains data, a TRUE is returned. A FALSE is returned otherwise. Conversely, in another embodiment of the present invention, this template is implemented as a Field Has No Data comparison template. Accordingly, if the field is empty, a TRUE is returned. A FALSE is returned otherwise.

A Form Was Transmitted comparison template 482 is used to test whether the form associated with the current set of validation rules has been transmitted by the mobile worker from the mobile computer 30 to the personal computer 10. If so, the expression returns the value TRUE. A FALSE is returned otherwise.

Figure 11:
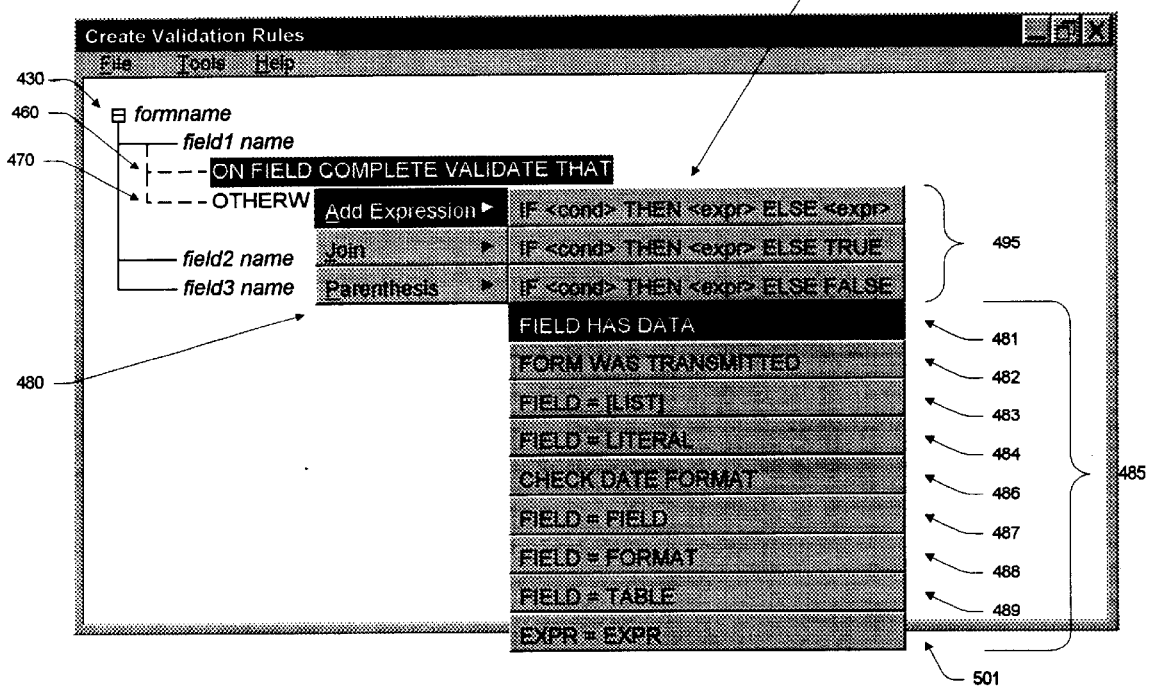
Figure 16:
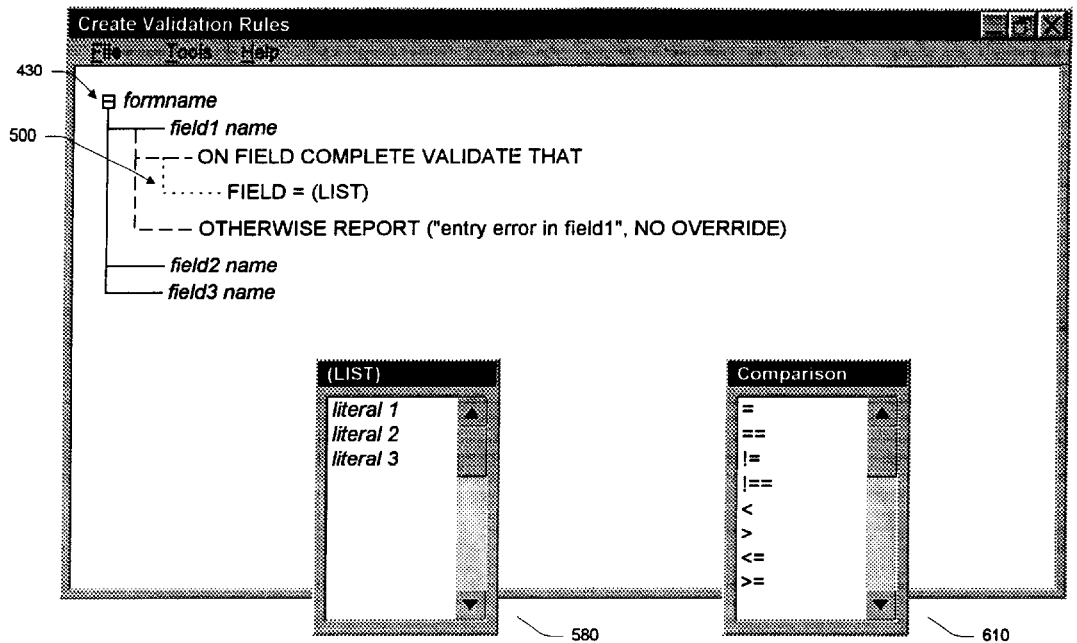

A Field=(List) comparison template 483 is used to test the contents of a field against one or more predefined literal values, which may be any numeric values or alphanumeric strings. Those skilled in the art will readily appreciate that where only a single literal is included in (List), the Field=Literal expression, discussed below, may be used instead. In one embodiment of the invention, the user selects this comparison expression template as well as a comparison operator. The comparison operators which are shown below in Table 1, are selected from comparison listbox 610 as shown in FIG. 16. However, it will be appreciated that the default comparison operator as shown in FIG. 11 is the "=" comparison operator.

TABLE 1

| Operator | Comparison Function |
| --- | --- |
| = | Non-case sensitive test for equality |
| == | Case-sensitive test for equality |
| != | Non-case sensitive test for inequality |
| !== | Case-sensitive test for inequality |
| < | Less than |
| > | Greater than |
| <= | Less than or equal to |
| >= | Greater than or equal to |

After a comparison operator is chosen from listbox 610, the user enters one or more new literal values into the (List) against which the data of the field will be compared via a listbox 580 as shown in FIG. 16. Those skilled in the art will readily appreciate that there are numerous ways to implement the (List) into which a user may enter values such as in a table, and a straight list among others. Additionally, with a listbox, the user may select previously entered items from the listbox to enter into the (List) for comparison. When evaluating a Field=(List) expression, the value in the field is tested against each value in the list individually. For example, if the "=" or "==" comparison operators are used, and the field is equal to any one of the values in the list, then the entire expression evaluates to TRUE, and if the "!=" or "!==" comparison operators are used, then the field cannot be equal to any value in the list or the entire expression will evaluate to FALSE.

A Field=Literal comparison template 484 is used to compare the contents of the associated field to a single numeric value or alphanumeric string predefined by the user. If the data in the field equals the literal value, a TRUE is returned. A FALSE is returned otherwise.

A CheckDateFormat comparison template 486 is used to validate the format of a date format field, i.e., a field for holding a date. If the format of the date in the field does not conform to the value in the date format field, FALSE is returned. This expression is used to standardize the way in which workers enter dates. A typical default format is MM/DD/YY for representing the month, day, and year, respectively, using two digits each. Any other date format may be implemented without departing from the spirit and scope of the present invention.

A Field=Field comparison template 487 is used to compare the contents of two fields. The second field of the expression may be selected by double-clicking on the second field from the tree, or by other well-known methods known in the art, e.g., by typing in the name of the second field, or by selecting from a listbox holding all available field names.

A Field=Format comparison template 488 is used to validate the format of the data entered in the associated field. Formats may be specified using special format characters such as those shown in Table 2 to require data to be of a particular type. The escape character "\" is used to ignore the data type for the immediately following character. For example, "\X##" checks for any two digit number following an "X" i.e., "X00" to "X99".

TABLE 2

| Character | Expected Data |
|---|---|
| # | (0–9) |
| A | (a–z, A–Z) |
| X | (a–z, A–Z, 0–9) |
| * | Any printable character |
| \ | Escape character |

Figure 17:
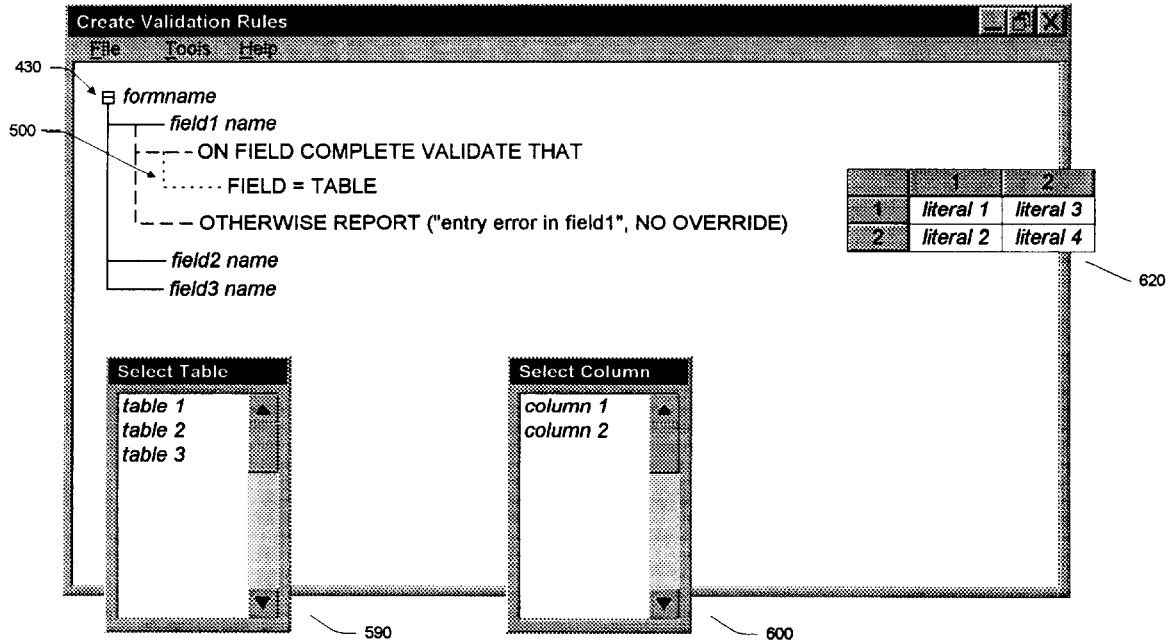

A Field=Table comparison template 489 is used to test whether the data entered in the field is a member of a table. The function of this expression is similar to that of the Field=(List) comparison template except that the user does not enter values upon selecting the template. Rather, the values have been predefined in a table, and the user simply selects the proper table holding comparison values from a listbox 590 displayed by the validation rules program 15 as shown in FIG. 17. In a present embodiment of the invention, the comparison values may be constrained to come from one or more specific rows or columns of the table, which may be selected from a listbox 600 as also shown in FIG. 17. In a present embodiment of the invention, the table 620 may be displayed to aid the user in making a column or row selection. FIG. 17, discussed in greater detail below, depicts an example where the Field=Table is selected as an expression for a validation rule and where values are to come from a column.

Finally, an Expr=Expr comparison template 501 serves as a catch-all template. If a service provider desires to implement a form requiring an expression which cannot be created with any of the other templates, the Expr=Expr template is used. This facility is used to create, for example, arithmetic expressions that are evaluated to a result that the field is compared to.

Those skilled in the art will readily appreciate that the comparison operators shown in Table 1 are applicable to each of the templates in the form of "Field=" as well as to the Expr=Expr template. Those skilled in the art will further recognize that not all comparison operators will be applicable to all expression templates at all times. For instance, only the equality and inequality comparisons are meaningful for a Field=Format expression, so the greater than and less than comparisons would not be made available to the corresponding Field=Format template. Further, those skilled in the art will recognize that case sensitivity will only be applicable to comparisons of alphanumeric strings.

Figure 12:
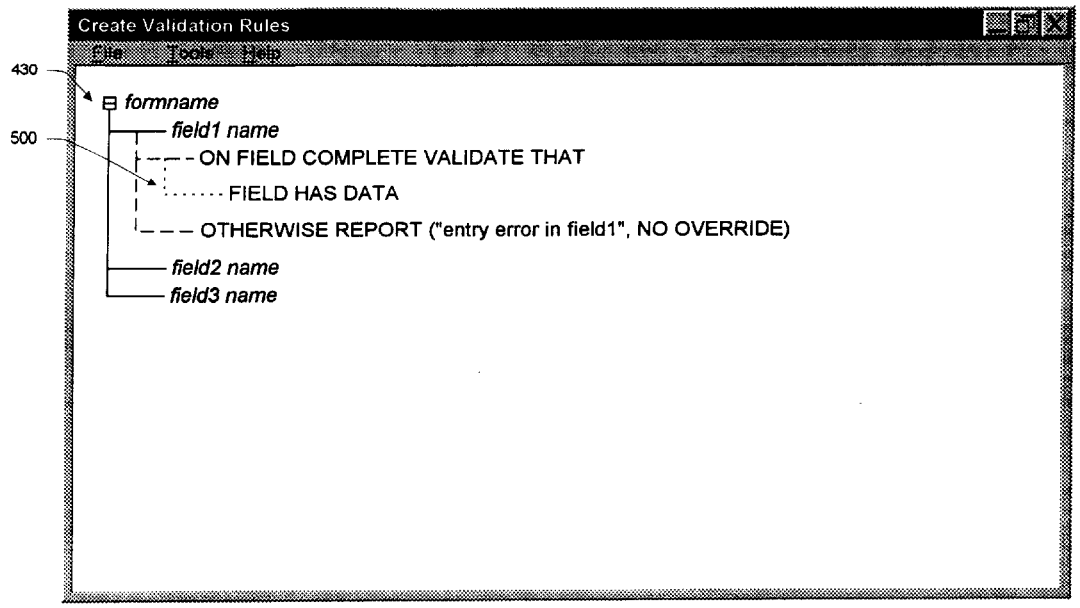

Returning to FIG. 5A, after the user has created an expression for the rule by choosing an appropriate template and filling in the blanks, the tree structure 430 is updated on the display 14 of the personal computer 10 in a block 240. As shown in more detail in FIG. 12, a first expression node 500 including the chosen expression, "FIELD HAS DATA" is shown as a subnode between the first and second rule nodes 460 and 470, respectively. In a second example, FIG. 16 depicts a situation where Field=(List) is the selected expression. The first expression node 500 reflects this selection with the text "FIELD=(LIST)," and a (List) listbox 580 is displayed allowing the user to either select a previously entered or predefined literal presented in the (List) listbox 580, or type in a new literal, which will be added to the (List) listbox 580.

In a third example, FIG. 17 depicts a situation where Field=Table is the selected expression. The first expression node 500 reflects this selection with the text "FIELD= TABLE", and a select table listbox 590 is displayed allowing the user to either select a previously entered or predefined table presented in the select table listbox 590, or type in a new table name, which will be added to the select table listbox 590. Upon selecting a table, a select column listbox 600 is displayed, and the user may select a column in a similar manner as selecting the table. As noted above, once the table and column have been identified, a comparison is performed in the same manner as for the Field=(List) expression.

Returning to FIG. 5A, if, in a decision block 250, no more expressions are to be added for the rule, the create rule(s) routine is complete. If, however, the user wishes to add more expressions to the validation rule, the create rules routine proceeds to a block 260 in FIG. 5B where, the add expression menu 490 is displayed once again. The user then selects and completes the desired expression in substantially the same manner as discussed with respect to blocks 230 and 240. Accordingly, the tree structure 430 is updated with the newly added expression in a block 270.

It will be appreciated that if the user adds multiple expressions to a validation rule, it is necessary to define their relationship so that the rule may be correctly translated. The user defines the relationship by setting a join type in a block 280, which is either conjunctive AND or a disjunctive OR, and which is used to indicate how multiple expressions are to be evaluated together.

Figure 13:
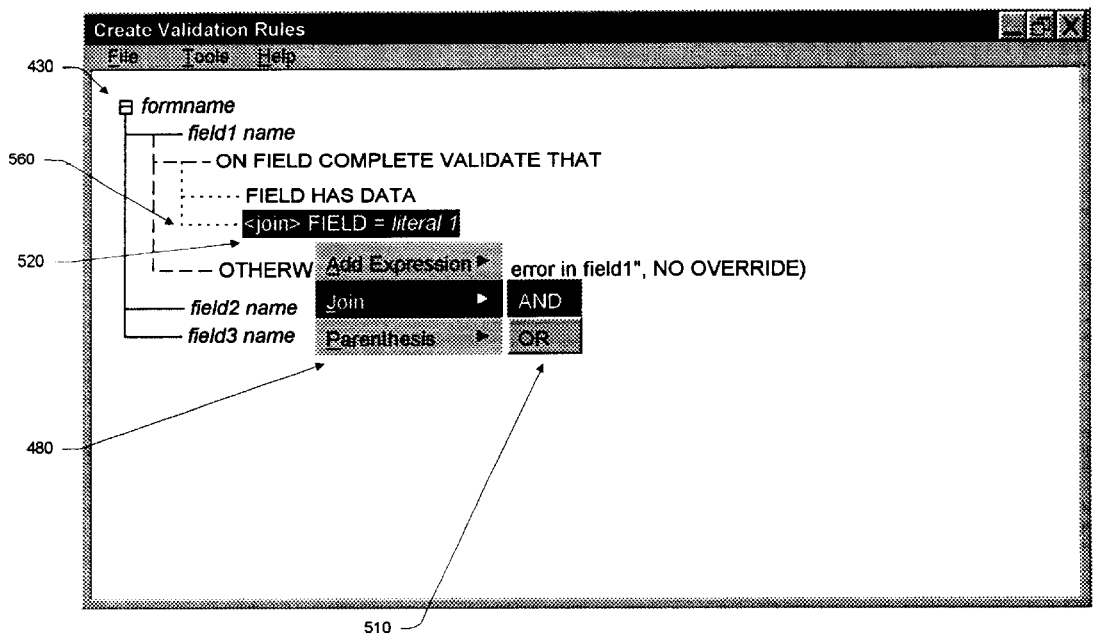

Referring to FIG. 13, the join type is selected by displaying the action menu 480 and choosing "Join," which allows the user to select whether the expressions are to be interpreted conjunctively, i.e., joined by an AND, or disjunctively, i.e., joined by an OR. For instance, if a field is to be tested for a numeric value between 5 and 13, two expressions will be required:

FIELD>5 and FIELD<13.

Since, in this example, both expressions must be true for the validation to pass, the two expressions should joined with an AND as:

FIELD>5

AND FIELD<13

Figure 14:
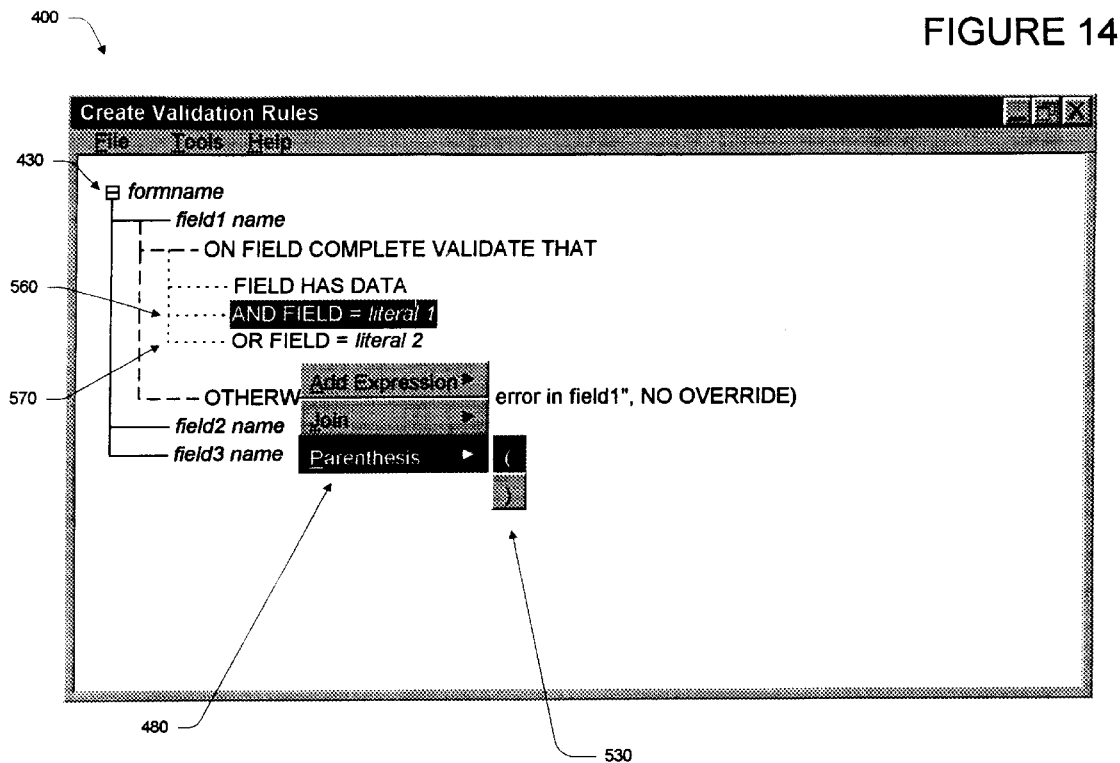

When more than one expression is created for the same rule, the tree structure 430 is updated with a <join> marker 520 at the front of a second expression node 560. This provides a visual cue to the user to select a join type for these two expressions before the rule can successfully be translated. For example, as shown in FIG. 13, if the user wishes to join the "FIELD HAS DATA" with the expression "FIELD=Literal 1," the user chooses "Join" from the action menu 480. Accordingly, the user selects the desired join type (AND or OR) from a join type menu 510. If AND is selected, the selected option replaces the <join> marker 520 preceding the second expression in the tree structure 430, as shown in FIG. 14.

Returning to FIG. 5B, if the user wishes to add still more expressions to the rule, blocks 260, 270 and 280 are repeated until all expressions have been added for the rule. Once all desired expressions have been added, the routine proceeds to a decision block 300 in which it determines whether more than two expressions having different join types have been created. It will be appreciated that if there are only two expressions, or if there is only one join type, then the create rule(s) routine is complete. However, if more than two expressions have been added to a validation rule and if there are different join types defined, an expression evaluation order must be specified. This is done using the "parenthesis" option of the action menu 480 as shown in FIG. 14. The parenthesis option allows the user to place parentheses around expressions, so that the expressions are evaluated in a particular order according to the well-known rules of mathematical hierarchy. For example, since the expressions

FIELD1>5 OR FIELD1<13 AND FIELD2 HAS DATA

0 Can be interpreted two different ways, i.e., as (FIELD1>5 OR FIELD1<13) AND FIELD2 HAS DATA or as

Figure 15:
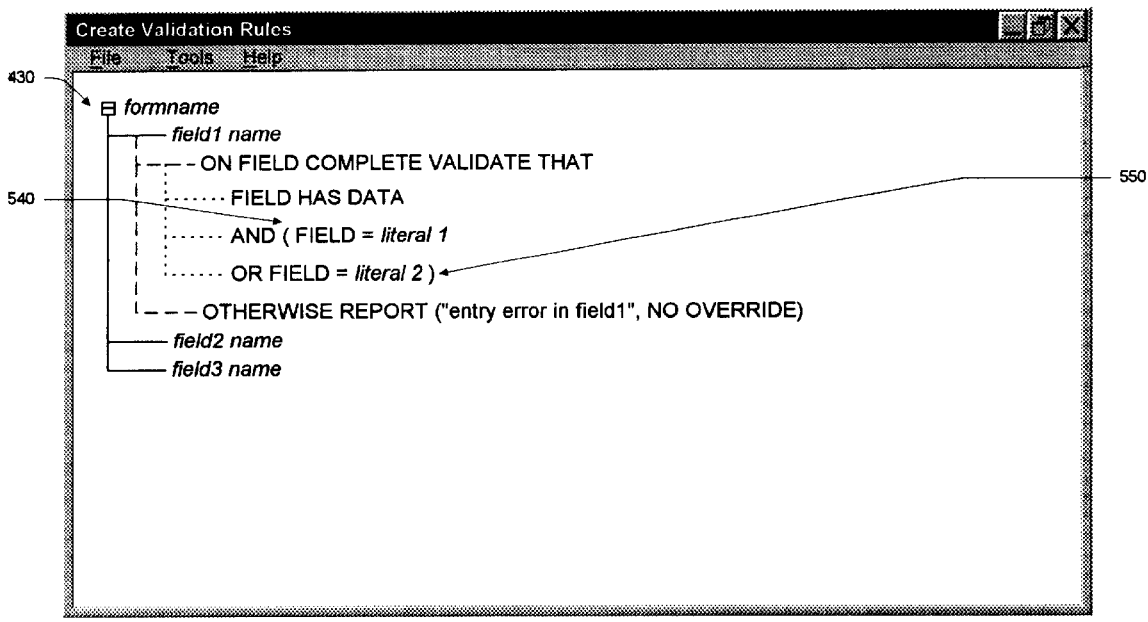

FIELD1>5 OR (FIELD1<13 AND FIELD2 HAS DATA)

the parenthesis function must be employed to specify the correct interpretation. In an embodiment of the present invention, a default interpretation is given as a standard, left-to-right, evaluation. To force another interpretation, the user selects the first of the two expressions to be enclosed in parentheses, by highlighting the first expression and selecting the parenthesis option from action menu 480. Accordingly, a parenthesis menu 530 is displayed. The parenthesis menu 530 includes choices for opening or beginning parenthesis, i.e., "(" and for closing or ending parenthesis, i.e., ")". The open parenthesis should be selected by the user to place a parenthesis before the first of the expressions to be evaluated together. The user then selects the second of the two expressions and places a close parenthesis after the second of the two expressions (as shown in the example of FIG. 14) in a similar manner as for placing the open parenthesis, and the displayed tree is updated accordingly in a block 310. While enclosing two expressions in parentheses has been described, those skilled in the art will recognize that more than two expressions may be enclosed in parentheses such as where all the join types connecting the expressions are the same, i.e., all ANDs or all ORs. FIG. 15 depicts the updated tree structure 430 with an open parenthesis 540 placed before a second expression node 560, and a close parenthesis 550 placed behind a third expression node 570.

Those skilled in the art will readily appreciate that the steps of specifying evaluation order and join type may be done after two or more, or even all expressions have been added, or at any time during the create rule(s) routine without departing from the spirit of the invention. It should also be noted that while parentheses are used in a present embodiment of the invention, brackets, braces, or any other grouping symbols may be used for the "parenthesis" option.

Returning to block 140 of FIG. 4, rules may be added for field2 and field3 if desired in the same manner as for field1. Once all fields which should have rules have been filled out, the set of validation rules is complete and the completed tree structure will be translated into a rule file to be executed by the MPA at the mobile computer in a block 150. The validation rules program then ends in a block 160. Since the completed tree structure contains all the validation rules, the tree structure is rendered as a textual rules file 16, which may be compiled into a set of validation rules according to techniques well known in the art and then executed by the MPA on the mobile computer 30, or simply interpreted by the MPA.

Once the rules file is executed or interpreted by the MPA, as a worker enters data into a field, that data is checked against a corresponding rule being executed or interpreted by the MPA for that field.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computer system having a processor couplable to a display and a memory, the memory storing a user interface enabling a user to create a set of validation rules for a form, wherein the form includes a plurality of fields for data entry, the user interface comprising:

(a) a tree structure having a root node representing a name of the form and at least one other node representing a field of the form; and (b) a rule creator for enabling the user to create a validation rule to be applied to said at least one field, wherein the validation rule includes at least one expression which defines a test to be performed on the field of the form, and wherein the tree structure is updated when the validation rule is created by adding a node representing the validation rule as a subnode of the at least one other node which represents the field.

2. The user interface of claim 1, wherein the validation rule includes a plurality of expressions, each of which defines a test to be performed on the field of the form.

3. The user interface of claim 2, wherein the rule creator enables the user to logically join the plurality of expressions of the validation rule.

4. The user interface of claim 3, wherein the rule creator enables the user to define an order in which the plurality of expressions of the validation rule are to be evaluated.

5. The user interface of claim 1, wherein the at least one expression is a comparison expression, which compares the field to a predefined value.

6. The user interface of claim 1, wherein the at least one expression is a conditional expression, which compares the field at least one predefined condition.

7. The user interface of claim 1, wherein the validation rule further includes at least one of an error message rule, a validation level rule and an override mode rule, wherein the error message rule indicates the error message to be displayed if the field fails the validation rule, wherein the validation level rule indicates when the validation rule to be applied against the field, and wherein the override mode rule indicates whether the validation rule may be overridden.

8. The user interface of claim 1, wherein the rule creator enables the user to create a validation rule to be applied against each of a plurality of fields of the form.

9. The user interface of claim 1 wherein the validation rule further includes an override mode rule that indicates whether the validation rule may overridden.

10. A method for creating a set of validation rules for a form, wherein the form includes a name and a plurality of fields for data entry, the method comprising:
   (a) representing the form as a tree structure having a root node and a plurality of leaf nodes, wherein the root node represents the name of the form, and each leaf node represents at least one of the plurality of fields of the form;
   (b) selecting at least one of the plurality of fields of the form against which one or more validation rules are to be applied;
   (c) creating the validation rule to be applied to said field, wherein the validation rule includes at least one expression which defines a test to be performed on said field; and
   (d) updating the tree structure to include the created validation rule by adding a subnode to the leaf node representing said field wherein the subnode represents the validation rule.

11. The method of claim 10, further comprising repeating (a), (b), (c) and (d) for more than one of the plurality of fields of the form.

12. The method of claim 11, further comprising translating the tree structure into a text file storing a textual interpretation of the validation rules represented by the tree structure.

13. The method of claim 10, wherein creating the validation rule to be applied comprises selecting the at least one expression to be applied to the field from a predefined list of expressions.

14. The method of claim 13, wherein creating the validation rule to be applied further comprises selecting more than one expression to be applied to the field from the predefined list of expressions.

15. The method of claim 14, wherein creating the validation rule to be applied further comprises selecting a logical joining between the selected expressions.

16. The method of claim 14, wherein creating the validation rule to be applied further comprises selecting an evaluation order for the selected expressions.

17. The method of claim 13, wherein creating the validation rule to be applied further comprises selecting an error message indicating whether the field has failed the validation rule.

18. The method of claim 13, wherein creating the validation rule to be applied further comprises selecting a validation level indicating when the validation rule is to be applied to the field.

19. The method of claim 13, wherein creating the validation rule to be applied further comprises selecting an override mode indicating whether the validation rule can be overridden if the field has failed the validation rule.

20. The method of claim 10, further comprising selecting a particular form for which a set of validation rules is to be created from a list of pre-existing forms.

21. The method of claim 10 wherein the validation rule further includes an override mode rule that indicates whether the validation rule may overridden.

22. A computer-readable medium having computer-executable components for enabling a user to create validation rules for a form, wherein the form includes a name and a plurality of fields for data entry, the computer-executable components comprising:
   (a) a form selection component for enabling the user to select a form for which to create validation rules from a list of forms;
   (b) a graphical display component for generating a graphical representation of the form to the user which includes the name of the selected form, the fields of the selected form and the validation rules created for the selected form; the graphical representation comprising a tree structure having a root node representing the name of the form, and at least one leaf node representing at least one field of the form; and
   (c) a rule creation component for enabling the user to create at least one validation rule for the form, wherein said at least one validation rule is added to the graphical representation of the form by the graphical display component upon creation of the validation rule by the rule creation component, the added graphical representation comprising at least one sub-leaf node representing each validation rule created by the user and a representation of the validation rule applied to at least one field of the form.

23. The computer-readable medium of claim 22, wherein the rule creation component enables the user to create at least one validation rule for the form by:
   (a) enabling the user to select at least one of the plurality of fields of the form against which said validation rule is to be applied; and
   (b) enabling the user to define at least one expression which defines a test to be performed on said selected field.

24. The computer-readable medium of claim 23, wherein the rule creation component further enables the user to create at least one validation rule for the form by enabling the user to define a plurality of expressions, wherein each expression defines a test to be performed on said selected field.

25. The computer-readable medium of claim 24, wherein the rule creation component further enables the user to create at least one validation rule for the form by enabling the user to define a logical joining of the plurality of expressions defined.

26. The computer-readable medium of claim 25, wherein the rule creation component further enables the user to create at least one validation rule for the form by enabling the user to define an order in which the plurality of expressions are to be evaluated.

27. The computer-readable medium of claim 23, wherein the rule creation component further enables the user to create at least one validation rule for the form by enabling the user to select at least one of an error message rule, a validation level rule and an override mode rule, wherein the error message rule indicates the error message to be displayed if the field fails the validation rule, wherein the validation level rule indicates when the validation rule to be applied against the field, and wherein the override mode rule indicates whether the validation rule may be overridden.

28. The computer-readable medium of claim 23, wherein the at least one expression is a comparison expression, which compares the field to a predefined value.

29. The computer-readable medium of claim 23, wherein the at least one expression is a conditional expression, which compares the field at least one predefined condition.

30. The computer readable medium of claim 22 wherein the validation rule further includes an override mode rule that indicates whether the validation rule may overridden.

31. An apparatus for creating validation rules for a form, wherein the form includes a name and a plurality of fields for data entry, the apparatus comprising:

(a) a processing unit;

(b) a storage medium coupled to the processing unit, the storage medium storing program code implemented by the processing unit for:

(i) selecting at least one of the plurality of fields of the form against which a validation rule is to be applied; and (ii) creating the validation rule to be applied to said field, wherein the validation rule includes at least one expression which defines a test to be performed on said field; and (c) a display coupled to the processing unit for displaying the name of the form, the fields of the form and the validation rules as a tree structure, wherein the tree structure includes a root node representing the name of the form, at least one leaf node representing each field of the form, and at least one sub-leaf node representing each validation rule created.

32. The apparatus of claim 31, wherein the program code implemented by the processing unit creates the validation rule by defining at least one expression to be applied to said field, wherein the at least one expression defines a test to be performed on said field.

33. The apparatus of claim 32, wherein the program code implemented by the processing unit further creates the validation rule by defining a plurality of expressions to be applied to said field, wherein each of the plurality of expressions defines a test to be performed on said field.

34. The apparatus of claim 33, wherein the program code implemented by the processing unit further creates the validation rule by defining a logical joining for the plurality of expressions to be applied to said field.

35. The apparatus of claim 34, wherein the program code implemented by the processing unit further creates the validation rule by defining an evaluation order for the plurality of expressions to be applied to said field.

36. The apparatus of claim 32, wherein the program code implemented by the processing unit updates the tree structure displayed by the display upon creation of the validation rule by adding a sub-leaf node representing the validation rule to the node representing said field.

37. The apparatus of claim 31, wherein the program code implemented by the processing unit creates a validation rule for more than one field of the form by:

(a) selecting more than one field of the form against which a validation rule is to be applied; and (b) creating the validation rule to be applied to each of said field, wherein the validation rule includes at least one expression which defines a test to be performed on said field.

38. The apparatus of claim 31 wherein the validation rule further includes an override mode rule that indicates whether the validation rule may overridden.

* * * * *